Dec. 2, 1969  G. F. WOODWARD  3,482,130
RELUCTANCE PICKUP SPEED DEVICE FOR A SPEEDOMETER CABLE
Filed Dec. 28, 1967
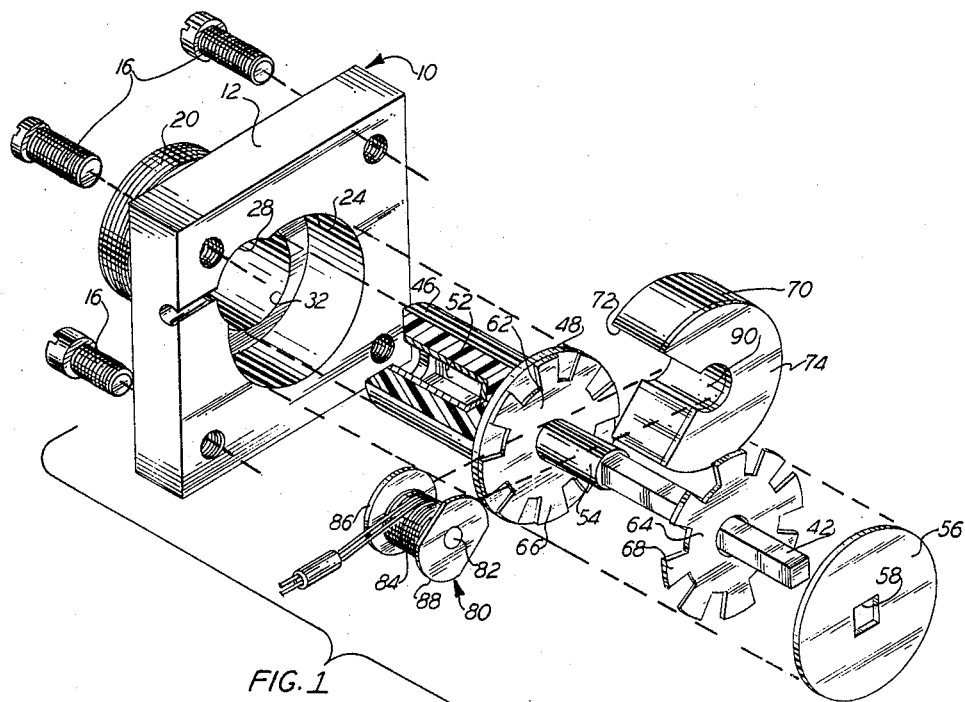
FIG. 1
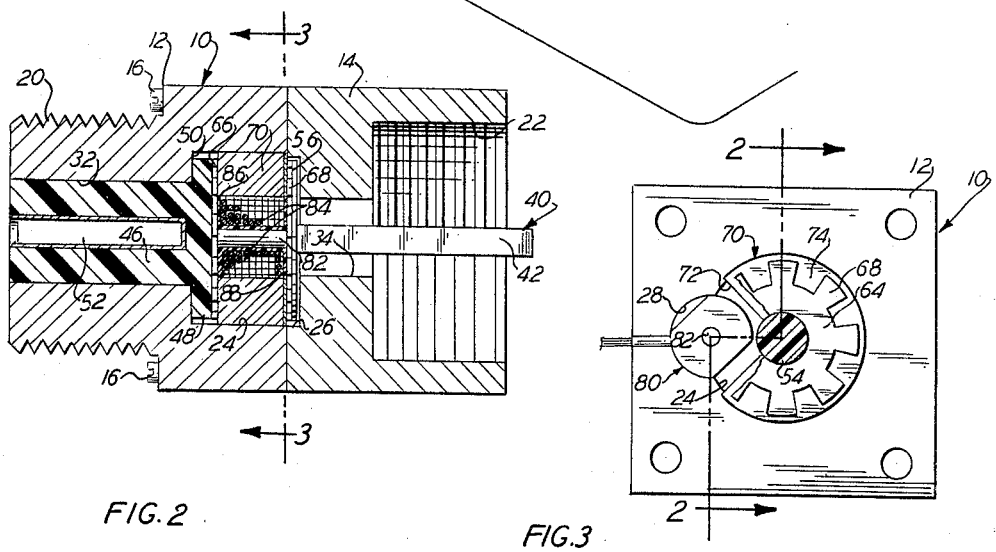
FIG. 2
FIG. 3
GARY F. WOODWARD
INVENTOR.
BY John R. Faulkner
Keith L. Zerschling
ATTORNEYS

United States Patent Office

3,482,130
Patented Dec. 2, 1969

3,482,130
RELUCTANCE PICKUP SPEED DEVICE FOR A SPEEDOMETER CABLE
Gary F. Woodward, Ann Arbor, Mich., assignor to Ford Motor Company, Dearborn, Mich., a corporation of Delaware
Filed Dec. 28, 1967, Ser. No. 694,333
Int. Cl. H02k 21/38
U.S. Cl. 310—155          8 Claims

ABSTRACT OF THE DISCLOSURE

A reluctance type pickup driven by a speedometer cable in which a pair of spaced vanes, constructed of a ferromagnetic material and having circumferentially spaced teeth, are suitably attached to a driven shaft driven by the speedometer cable. A permanent magnet, polarized axially with respect to the axis of the speedometer cable or driven shaft, is positioned intermediate the vanes and in close proximity thereto. This permanent magnet has a C-shaped opening with a pickup coil positioned therein having an iron core extending between the circumferentially spaced teeth on the spaced vanes. All of the above mentioned components may be positioned in a ferromagnetic housing, and as the driven shaft is rotated, a suitable output signal will be generated in the pickup coil.

Background of the invention

Reluctance pickup devices have been previously known in the prior art, for example, those shown in Patent Nos. 1,401,883 and 2,669,669. In each of these devices, a permanent magnet either of cylindrical or U-shaped type may be employed with a vane that is rotatable by some suitable means. Pickup devices in the form of coils having iron cores are employed in these devices to produce an output signal.

The prior art devices described above and shown in the above mentioned patents are complex and employ an unusually large amount of space so that they are not particularly suited for use with a speedometer cable where space is at a premium and where the routing of the speedometer cable is critical.

Summary of the invention

In the invention a non-ferromagnetic housing is employed that includes an axial bore having an axially polarized permanent magnet positioned therein in suitably affixed relationship with respect to a pickup coil that is mounted in an open portion of the permanent magnet and that has an iron core extending axially in the direction of polarization of the permanent magnet. A pair of spaced vanes having circumferentially spaced teeth are provided on each side of the permanent magnet and these vanes are suitably affixed to the speedometer cable or a shaft driven thereby.

As the vanes rotate, flux is alternately linked through the iron core of the pickup coil thereby generating an alternating voltage in the coil of some given waveform which may be taken from the output circuit of the pickup coil and employed in an electronic circuit, for example, an electronic speed control device.

Brief description of the drawings

FIGURE 1 is an exploded view of a portion of the reluctance type speedometer pickup of the present invention;

FIGURE 2 is a longitudinal sectional view of the reluctance type speedometer pickup device taken along the lines 2—2 of FIGURE 3; and FIGURE 3 is a cross sectional view partially in elevation taken along the lines 3—3 of FIGURE 2.

Description of the preferred embodiment

Referring now to the drawings in which like reference numerals designate like parts throughout the several views thereof, there is shown in the drawings a housing 10 which is constructed of a non-ferromagnetic material, such as, aluminum. This housing is comprised of a first part 12 and a second part 14 which may be suitably fixed together by means of a plurality of screws which are shown in FIGURES 1 and 2 at 16.

The first part 12 of the housing 10 has an externally threaded barrel 20 which will permit it to be suitably affixed to a speedometer cable. The second part 14 of the housing 10 has an internally threaded portion 22 which will permit this portion of the housing to be secured to a speedometer housing or other portion of a speedometer cable.

The portion 12 of the housing 10 has an internal bore 24 which may be positioned in alignment with a complementary internal bore 26 positioned in the portion 14 of the housing 10. In addition, the cylindrical bore 24 has a radially outwardly extending arcuate opening or aperture 28 which is positioned off-center with respect to the internal bore 24.

Additionally, the first part 12 of the housing 10 has a bore 32 positioned coaxially with respect to the bores 24 and 26 positioned in the housing portions 12 and 14, respectively, and the housing section 14 has a smaller cylindrical bore 34 positioned coaxially with respect to the cylindrical bores 32, 24, 26 and 22 positioned in the housing 10.

A driven shaft 40 is positioned within the housing 10. This driven shaft 40 may have a rectangular end portion 42 that may be inserted within an opening in a driven portion of a speedometer or speedometer cable.

The driven shaft 40 is journalled and supported for rotation in the housing 10 by an enlarged, cylindrical portion 46 that may be suitably journalled within the cylindrical bore 32 in the first part 12 of the housing 10. This cylindrical portion 46 may have a radially enlarged disc 48 positioned in engagement with a shoulder 50 formed in the intermediate section between the bores 32 and 24 positioned within the housing portion 10 to axially locate the portion 46 of the driven shaft 40. The portion 46 of the driven shaft 40 may have an axially extending centrally located opening 52 for the reception of another shaft, for example, the rotatable shaft of a speedometer cable.

The driven shaft 40 also has a centrally located cylindrical portion 54 with axially spaced discs 48 and 56 positioned on either side thereof. The disc 48 may be the radially enlarged disc formed integrally with the cylindrical portion 46 located in the bore 32. This disc 48 is located in the bore 24 and is positioned in engagement with the shoulder 50, while the other axially spaced disc 56 may be suitably affixed to the squared portion 42 of the driven shaft 40 by means of a square or rectangular opening 48. This disc 56 may be positioned within bore 26 of the part 14 of the housing 10.

A pair of axially spaced vanes 62 and 64 are positioned interiorly of the spaced discs 48 and 56, respectively, and are affixed thereto by any suitable means, for example, by an epoxy resin glue. These spaced vanes 62 and 64 are formed of a ferromagnetic material and have circumferentially spaced teeth represented by the numerals 66 on the vane 62 and 68 on the vane 64.

An axially polarized permanent magnet 70 having a circumferentially spaced opening 72 therein is positioned within the bore 24 of the first part 12 of the housing 10. This permanent magnet may be of the ceramic type and may be press fitted in the bore 24 or fixed therein by any suitable means. The opening 72 is positioned in juxtaposed relationship with respect to the radially extending opening 28 in the housing portion 12. The permanent magnet 70 may also have a complementary formed ferromagnetic keeper 74 positioned in contact with one side thereof.

A pickup coil generally designated by the numeral 80 is comprised of a centrally located, axially extending iron core 82 which has wound thereon a plurality of turns of wire 84. The end portions of the pickup coil 80 may be formed of plastic discs 86 and 88.

As can be readily appreciated by an inspection of the drawings, particularly FIGURE 3, the pickup coil 80, as previously stated, is positioned within the radially extending opening 28 positioned in the part 12 of the housing 10. The iron core of the pickup coil 80, as well as, a portion of the winding 84 and the end caps 88 and 86 are positioned within the circumferential opening 72 in the permanent magnet 70.

It can be appreciated, therefore, that the permanent magnet is positioned in the housing 10 intermediate the ferromagnetic vanes 62 and 64 and its axial length and its positioning within the housing 10 is such that the driven shaft 40 may freely rotate with respect to the permanent magnet 70. For this purpose, a cylindrical opening 90 is provided within the permanent magnet 70 and the keeper 74 so that the cylindrical portion 54 of the driven shaft 40 may rotate freely therein. The sides of the permanent magnet, however, are positioned closely adjacent the vanes 62 and 64 so that a minimum air gap is provided between the sides of the permanent magnet and the vanes.

In the operation of the reluctance type pickup of the present invention, the driven shaft 40 will drive the vanes 62 and 64 so that the spaced teeth 66 located on the vane 62 and the spaced teeth 68 located on the vane 64 will align themselves with the iron core 82 of the pickup coil 80 in a periodic and alternating sense. It should be noted from the drawings that the teeth 66 and 68 on the two vanes 62 and 64 are circumferentially aligned. As a result, when these vanes come into alignment with the iron core 82 of the pickup coil 80, the flux from the axially polarized permanent magnet 70 passes through the iron core 82 of the pickup coil 80 and thus, the flux from the permanent magnet is linked with the winding 84 of the pickup coil 80. As the teeth 66 and 68 come out of alignment with the iron core 82 and the spaces between the teeth come into alignment with the iron core 80, there is little, if any, flux passing through the iron core 82 and hence, little, if any, flux linked through the winding 84.

As the driven shaft 40 is rotated, therefore, the flux of the permanent magnet 70 is alternately linked and unlinked with the winding 84 thereby producing a time varying change in flux linking the winding 84. This in turn produces an alternating current voltage that may be employed to operate a suitable electronic device, for example, an electronic speed control device.

The driven shaft 40 including the enlarged extension 46 which is journalled within the cylindrical opening 32 of the housing portion 12 and the discs 48 and 56 are constructed of a non-ferromagnetic material. Preferably, this material is a plastic of the self-lubricating type to thereby reduce the friction within the structure of the invention.

The location of the axially polarized permanent magnet 70 and the pickup coil 80 in the housing 10 provides a structure which is uncomplicated and saves a considerable amount of space over the conventional reluctance pickup types that are typified by the prior art discussed in the previous portion of the specification. This permits the reluctance type pickup device of the present invention to be readily employed in automotive applications where space is at a premium and also, where routing problems of a speedometer cable are of primary and paramount importance.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. A pulse generator means for use with a speedometer cable and for producing pulses having a frequency proportional to the rotational speed of the speedometer cable comprising, a non-ferromagnetic housing, a driven shaft mounted in said housing and adapted to be driven by said speedometer cable, said driven shaft having a cylindrical portion journaled in said housing, said portion being constructed of a self-lubricating plastic material, a generally cylindrical permanent magnet mounted in said housing and polarized in an axial direction with respect to the speedometer cable, said permanent magnet having an opening therein, a pickup coil mounted in said opening, a pair of spaced vanes each having a plurality of spaced teeth positioned thereon mounted on said driven shaft and driven thereby, one of said vanes being positioned in said housing and on one side of said permanent magnet and said coil and the other of said vanes being positioned in said housing and on the other side of said permanent magnet and said coil.

2. The combination of claim 1 in which a plastic disc is positioned outboard of each of said vanes with respect to said permanent magnet, each of said plastic discs being affixed to said driven shaft to be driven thereby.

3. A pulse generator means for use with a speedometer cable and for producing pulses having a frequency proportional to the rotational speed of the speedometer cable comprising, a non-ferromagnetic housing, a driven shaft mounted in said housing and adapted to be driven by said speedometer cable, said housing having a cylindrical bore, a generally cylindrical permanent magnet positioned within said cylindrical bore in said housing and polarized in an axial direction with respect to the speedometer cable, said housing having a generally radially extending arcuate shaped opening communicating with said central bore, said permanent magnet having an opening therein, a pickup coil mounted in said opening in said permanent magnet and positioned within said generally radially extending arcuate shaped opening in said housing, a pair of spaced vanes each having a plurality of spaced teeth positioned thereon mounted on said driven shaft and driven thereby, one of said vanes being positioned in said housing and on one side of said permanent magnet and said coil and the other of said vanes being positioned in said housing and on the other side of said permanent magnet and said coil.

4. The combination of claim 3 in which said generally cylindrical shaped permanent magnet has a central opening with the driven shaft extending through said opening.

5. The combination of claim 4 in which said driven shaft is constructed of a non-ferromagnetic material and is rotatably journalled within said housing.

6. The combination of claim 5 in which said driven shaft is constructed of a plastic material having self-lubricating properties.

7. The combination of claim 3 in which said pickup coil has a central core extending in a direction generally parallel to the axis of said speedometer cable and is positioned in alignment with the spaced teeth on said vanes.

8. The combination of claim 7 in which a pair of spaced plastic discs are positioned outboard of said vanes with respect to said permanent magnet and are positioned in engagement with said vanes.

References Cited

UNITED STATES PATENTS

| | | | |
|---|---|---|---|
| 1,401,883 | 12/1921 | Crabb | 310—155 |
| 1,853,220 | 4/1932 | Nowosielski | 310—155 |
| 1,771,830 | 7/1930 | Walther | 310—155 |
| 2,605,753 | 8/1952 | Madle | 310—70 |
| 2,669,669 | 2/1954 | Spaulding | 310—155 |
| 3,077,549 | 2/1963 | Zelina | 310—155 |

MILTON O. HIRSHFIELD, Primary Examiner

R. SKUDY, Assistant Examiner

U.S. Cl. X.R.

310—168